United States Patent
Yamada et al.

(10) Patent No.: US 6,929,285 B2
(45) Date of Patent: Aug. 16, 2005

(54) AIR BAG

(75) Inventors: Tadashi Yamada, Aichi (JP); Tadashi Yamamoto, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/438,934

(22) Filed: May 16, 2003

(65) Prior Publication Data

US 2004/0026912 A1 Feb. 12, 2004

(30) Foreign Application Priority Data

May 22, 2002 (JP) .................................... P2002-148127

(51) Int. Cl.⁷ ............................................. B60R 21/16
(52) U.S. Cl. .................................................. 280/743.2
(58) Field of Search ........................... 280/743.2, 743.1

(56) References Cited

U.S. PATENT DOCUMENTS

| | | | | |
|---|---|---|---|---|
| 5,358,273 A | * | 10/1994 | Onishi et al. | ............. 280/743.1 |
| 5,362,101 A | * | 11/1994 | Sugiura et al. | ........... 280/743.2 |
| 5,380,038 A | * | 1/1995 | Hawthorn et al. | ........ 280/730.1 |
| 5,683,109 A | * | 11/1997 | Birman | ..................... 280/743.2 |
| 6,431,599 B1 | * | 8/2002 | Bohn | ....................... 280/743.1 |
| 6,572,144 B2 | * | 6/2003 | Igawa | ...................... 280/743.1 |

FOREIGN PATENT DOCUMENTS

| | | | |
|---|---|---|---|
| DE | 41 42 326 | 6/1993 | |
| DE | 43 05 050 | 9/1993 | |
| DE | 200 22 016 | 12/2001 | |
| JP | 01132444 | 5/1989 | |
| JP | 5-112194 | * 5/1993 | ............. 280/743.2 |
| JP | 5-201301 | * 8/1993 | ............. 280/743.2 |
| JP | 07156733 | 6/1995 | |
| JP | A-H09-263204 | 10/1997 | |

* cited by examiner

*Primary Examiner*—Eric Culbreth
(74) *Attorney, Agent, or Firm*—Posz Law Group, PLC (57) ABSTRACT

An air bag is formed by joining together the outer peripheral edges of a pair of bag cloths substantially identical in the outer shape with each other. One of the pair of bag cloths constitutes an occupant side surface which, when the air bag is deployed, is located on the occupant side, while the other constitutes a vehicle body side surface which, when the air bag is deployed, is located on the vehicle body side. In the interior of the air bag, there are disposed drawing strips which pull in the outer peripheral edges of the occupant side surface and vehicle body side surface to the vicinity of the central portion of the air bag when the air bag is deployed.

3 Claims, 9 Drawing Sheets

AIR BAG

The present application is based on Japanese Patent Application No. 2002-148127, the entire contents of which are incorporated herein by reference.

BACKGROUND OF THE INVENTION

1. Field of the Invention

The present invention relates to an air bag of an air bag apparatus to be carried on board a vehicle and, in particular, to a plane-type air bag, which can be formed by joining together the respective outer peripheral edges of a pair of bag cloths substantially identical in the outer shape with each other.

2. Description of the Related Art

Conventionally, as disclosed in JP-9-263204, there is known a plane-type air bag that can be formed by joining together the respective outer peripheral edges of a pair of bag cloths substantially identical in the outer shape with each other.

The air bag disclosed in the cited publication includes a pair of circular-shaped wall portions substantially identical in shape with each other; specifically, one is a vehicle body side (steering wheel side) surface, and the other is an occupant side (driver side) surface. And, the air bag is formed by sewing and joining together the respective outer peripheral edges of the vehicle body side and occupant side surfaces. Also, in the interior of the air bag, there is disposed a tether which is used to restrict the mutual spacing distance between the vehicle body side and occupant side surfaces when the air bag is deployed. The tether is disposed so as to join the peripheral edge of an opening for inflator insertion to the portion of the occupant side surface that is opposed to the opening.

However, in the above plane-type air bag, since the respective outer peripheral edges of the vehicle body side and occupant side surfaces are joined, there is found the following problem. That is, it is difficult to increase the thickness of the peripheral edge of the air bag in the deployment thereof to thereby dispose a portion having an increased capacity, for example, between the abdomen of the occupant (driver) and the ring portion of a steering wheel.

To increase the thickness of the outer peripheral edge of the air bag, the air bag cloths may be sewn together into a three-dimensional shape to form an air bag. However, in the case of such a three-dimensional air bag, it is impossible to employ an easy producing step, as in the case of a plane-type air bag, in which the air bag cloths can be developed flat, the occupant side and vehicle body side surfaces can be superimposed on top of each other, and the occupant side and vehicle body side surfaces can be sewn and joined together. That is, it takes much time and labor to manufacture the three-dimensional-shaped air bag.

SUMMARY OF THE INVENTION

The invention aims at eliminating the drawbacks found in the above-mentioned conventional-type air bag. Accordingly, it is an object of the invention to provide an air bag which, even in case where it is formed as an air bag of a plane air bag type, can be easily expanded thick in the given portions of the outer peripheral edge thereof.

In attaining the above object, according to the invention, there is provided an air bag formed by joining together the respective outer peripheral edges of a pair of bag cloths substantially identical in the outer shape with each other, one of the pair of bag cloths constituting an occupant side surface to be located on the occupant side in the deployment of the air bag, the other constituting a vehicle body side surface to be located on the vehicle body side in the deployment of the air bag, wherein, in the interior of the air bag, there are disposed drawing strips for pulling in the outer peripheral edges of the occupant side and vehicle body side surfaces in the deployment of the air bag to the vicinity of the central portion of the air bag.

According to the air bag of the invention, since the outer peripheral edges of the occupant side and vehicle body side surfaces joining together the occupant side and vehicle body side surfaces are pulled in to the vicinity of the central portion of the air bag in the deployment of the air bag, in the thus-pulled-in outer peripheral edge portions of the air bag, the outer peripheral edges of the occupant side and vehicle body side surfaces bite into the air bag, thereby being able to increase the substantial thickness of the present outer peripheral edges of the air bag.

And, because means for increasing the thickness of the outer peripheral edges of the air bag can be constructed simply by the drawing strip for pulling in the outer peripheral edges of the occupant side and vehicle body side surfaces to the vicinity of the central portion of the air bag, the operation to join together the surfaces by sewing and the operation to join the drawing strip to the given position can be carried out easily. This means that the invention does not impair the easy manufacture of a plane-type air bag.

Therefore, an air bag according to the invention, even in the case of a plane-type air bag, can be manufactured simply without taking excessive time and labor in manufacturing and, like a three-dimensional-shaped air bag, can be easily expanded thickness wise in the given portions of the outer peripheral edges thereof.

By the way, the drawing strip may be disposed one or more in number. And, when using a plurality of drawing strips, they may be disposed at arbitrary positions; and, they may be disposed at symmetric positions with the vicinity of the center of the air bag as the reference, or they may be disposed in a radial manner.

Also, in the case of an air bag according to the invention, the portions of the air bag that are pulled in by the drawing strip are reduced in capacity when compared with a state in which they are not pulled in. For this reason, in the case where the capacity of an air bag of a non-pull type is equal to the capacity of an air bag according to the invention, according to the air bag of the invention, the capacity of the other portions of the air bag than the portions thereof to be pulled in can be increased. That is, by extending outwardly the outer peripheral edges of the occupant side and vehicle body side surfaces that are located in the given portions of the air bag, namely, the other portions than the pull-in portions of the air bag, the capacity of the present given portions can be increased. And, for example, in the case where the portions of the outer peripheral edges of the air bag to be extended are set as the portions to be interposed between the ring portion of the steering wheel and the abdomen of the occupant (driver), the abdomen of the driver can be protected effectively. Of course, in this case as well, in the case where an air bag according to the invention is equal in capacity to an air bag of a non-pull type, an inflator having the same output can be used without delaying the time necessary to complete the expansion of the air bag.

(2) And, in the case where the drawing strip is formed integrally with the occupant side surface or vehicle body side surface in such a manner that it is extended from the outer peripheral edge of the occupant side surface or vehicle body side surface, there can be eliminated the need to dispose the drawing strip as a separate member, so that the number of the composing parts of the air bag is not increased. And, since the arrangement of the drawing strip can be completed simply by joining only the leading end portion side of the drawing strip to the vicinity of the central portion of the air bag, an increase in the number of the manufacturing steps of the air bag and costs thereof can be restricted as much as possible.

(3) In the interior of the air bag, there is disposed a tether for restricting the mutual spacing distance between the occupant side and vehicle body side surfaces in the deployment of the air bag. Thus, even when the outer peripheral edge of the air bag is thick, the plane state of the occupant side surface can be secured. Therefore, when the occupant side surface interferes with the occupant, partial pressure cannot be applied to the occupant, which can enhance the occupant protecting performance of the air bag.

(4) In the case where the tether is structured in such a manner that not only it includes an occupant side portion to be sewn and joined to the occupant side surface and a vehicle body side portion to be sewn and joined to the vehicle body side surface but also the respective end portions of the occupant side and vehicle body side portions are sewn and joined together, preferably, one end portion of the drawing strip may be joined to the outer peripheral edge of the occupant side surface or vehicle body side surface, and the other end portion may be sewn and joined to the tether at the same time when the end portions of the occupant side and vehicle body side portions of the tether are sewn and joined together.

According to this structure, the operation to join the leading end portion of the drawing strip that extends toward the central portion of the air bag need not be executed separately and, even in the case where the drawing strip is disposed in the interior of the air bag, an increase in the number of the manufacturing steps and costs of the air bag can be restricted further.

(5) Further, in the case where the occupant side and vehicle body side surfaces are respectively formed in a substantially circular shape, there can be obtained the following operations and effects. That is, when an air bag (a conventional-type air bag) in which occupant side and vehicle body side surfaces are respectively formed in a substantially circular shape and the outer peripheral edge of the air bag is not pulled in is compared with an air bag according to the invention in which the occupant side and vehicle body side surfaces are respectively formed in a substantially circular shape, according to the invention, using the occupant side and vehicle body side surfaces each having a large outside diameter dimension, there can be manufactured an air bag which has the same capacity as the conventional-type air bag. And, in the case where the occupant side and vehicle body side surfaces are respectively formed in a substantially circular shape, similarly to the conventional-type air bag, by executing the operation to join together the outer peripheral edges of the occupant side and vehicle body side surfaces, an air bag according to the invention can be manufactured easily. In other words, an air bag according to the invention, in which the capacity of a given portion thereof is increased, can be manufactured simply while maintaining the manufacturing process for manufacturing the conventional-type air bag as much as possible.

(6) In this case, in order to be able to use an air bag according to the invention in an air bag apparatus for a steering wheel, preferably, the drawing strip may be disposed in the two portions of the outer peripheral edges of the occupant side and vehicle body side surfaces on the right and left edge sides thereof in such a manner that the right and left edge sides of the outer peripheral edges of the occupant side and vehicle body side surfaces can be pulled in to the vicinity of the central portion of the air bag when the air bag is carried on board the vehicle and the air bag is deployed.

According to the above structure, the air bag, when the expansion thereof is completed, provides a cocoon shape (a gourd shape) in which the left and right portions of the outer peripheral edges of the air bag are dented to thereby extend the front and rear portions of the air bag. That is, the air bag has a shape in which the front and rear end portions of the air bag serving as an area for protecting the head portion and abdomen (or chest) of the driver when the driver approaches the steering wheel W side increase in capacity and are thereby extended on the front and rear sides thereof, thereby being able to protect the driver effectively. Further, although the left and right edges of the air bag in the deployment of the air bag increase in thickness, they are dented toward the central side of the air bag by an amount corresponding to the pulled-in right and left portions thereof when compared with the conventional-type air bag. Therefore, the left and right portions of the air bag are made difficult to interfere with the arm of the driver gripping the ring portion of the steering wheel, thereby being able to prevent unnecessary pressure caused by the expansion of the air bag from being applied to the vicinity of the driver's arm.

DETAILED DESCRIPTION OF THE PREFERRED EMBODIMENTS

Figure 1:
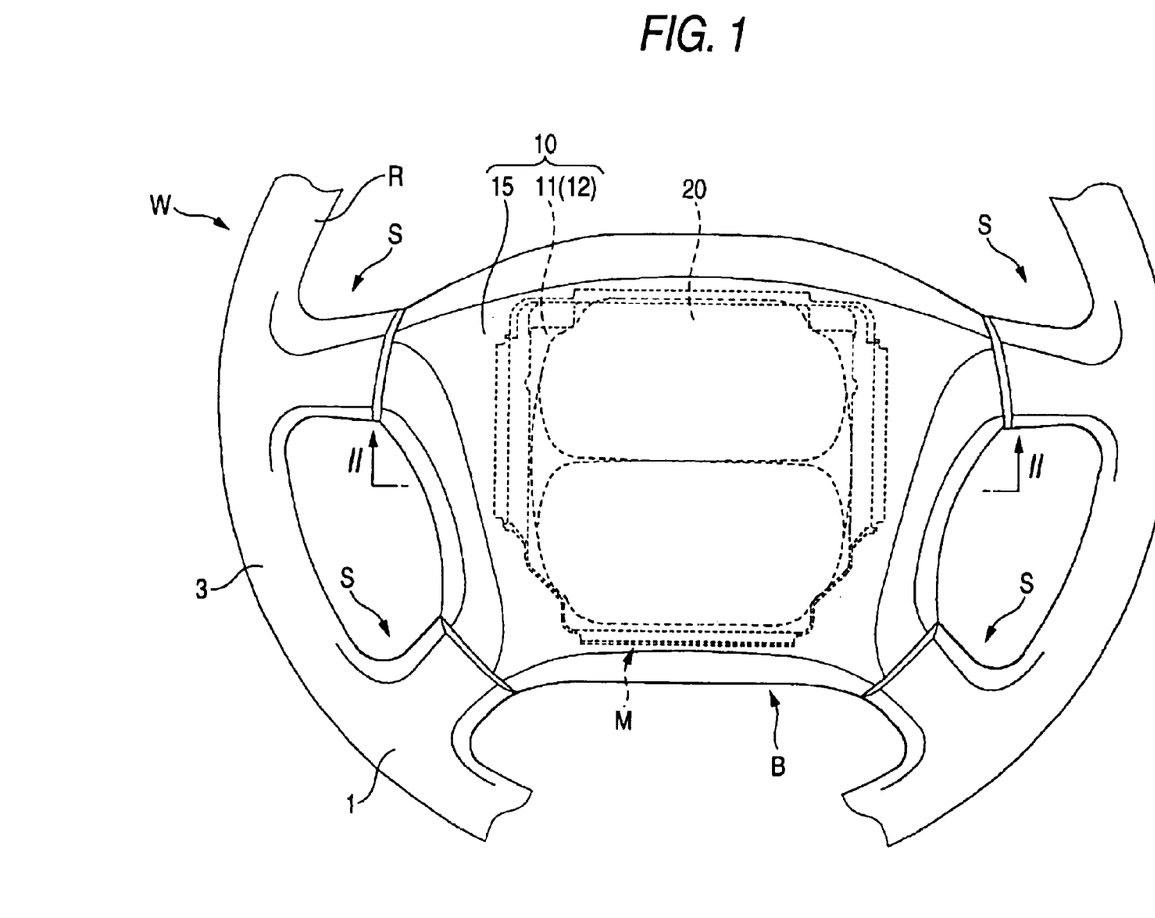
FIG. 1 is a plan view of a steering wheel on which an air bag apparatus using an embodiment of an air bag according to the invention is to be carried.
Figure 2:
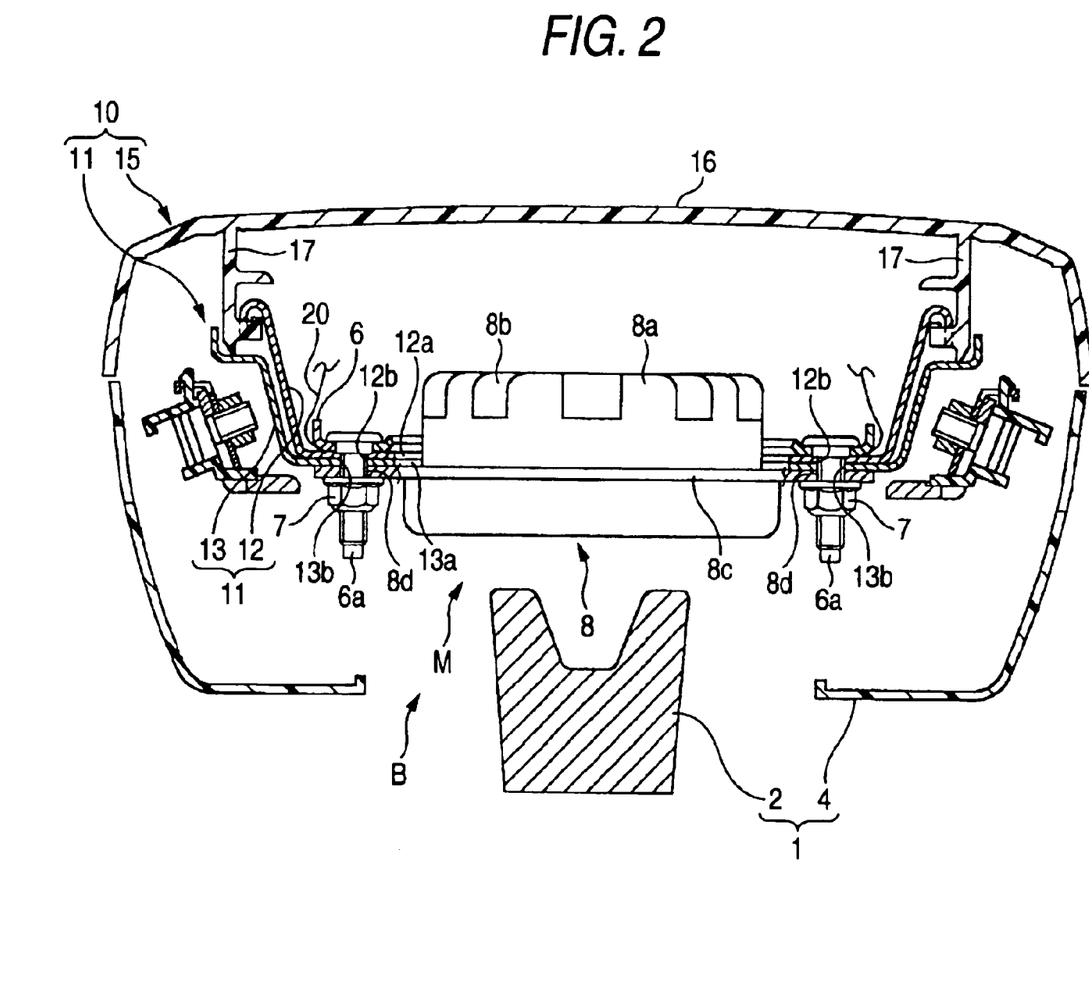
FIG. 2 is a schematic section view of the above steering wheel, corresponding to the portion II—II shown in FIG. 1.
Figure 3:
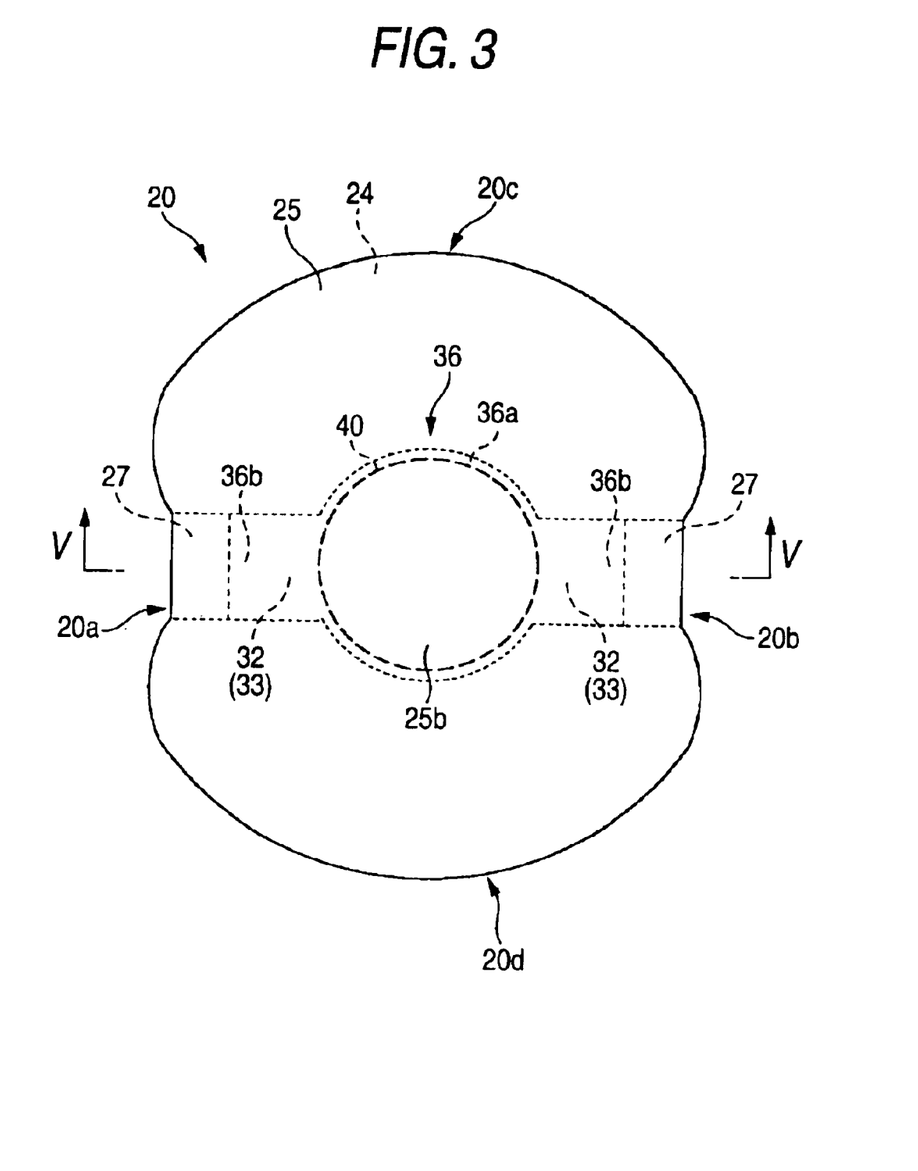
FIG. 3 is a plan view of an air bag according to the above embodiment in an unfolded and unexpanded state.
Figure 4:
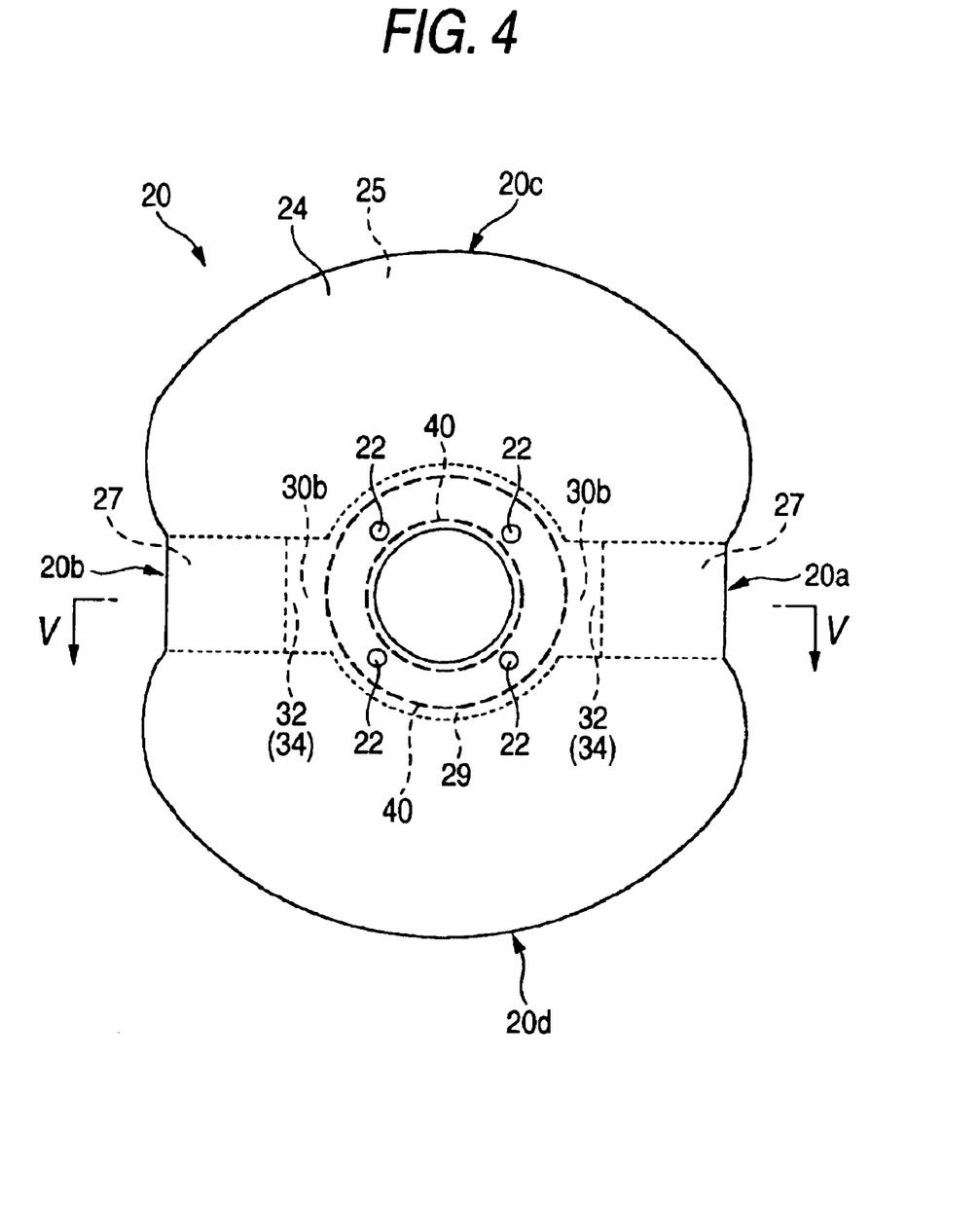
FIG. 4 is a bottom view of the airbag of FIG. 3.
Figure 5:
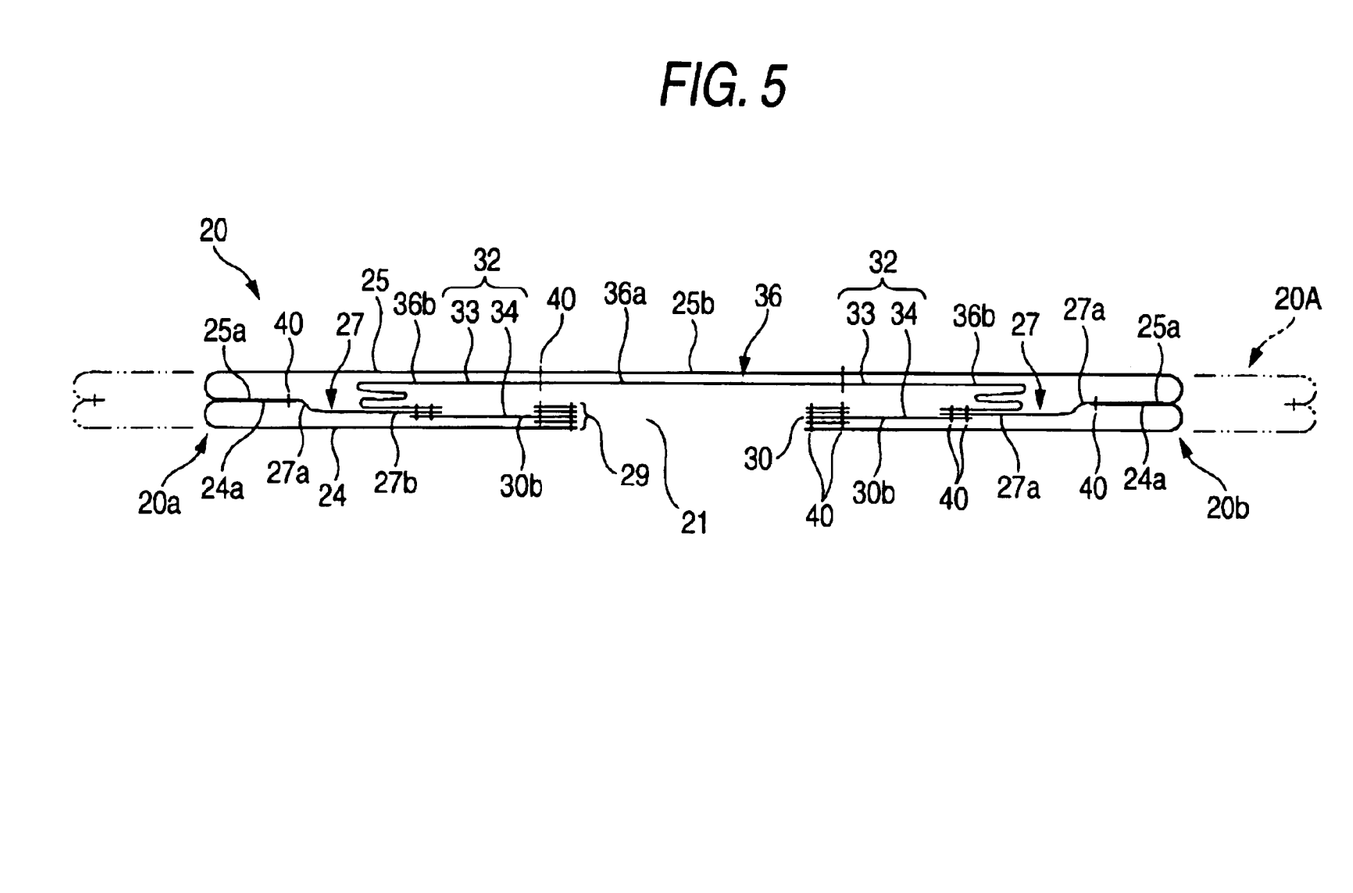
FIG. 5 is a schematic section view of the air bag in its developed state, corresponding to the portion V—V shown in FIGS. 3 and 4.
Figure 6:
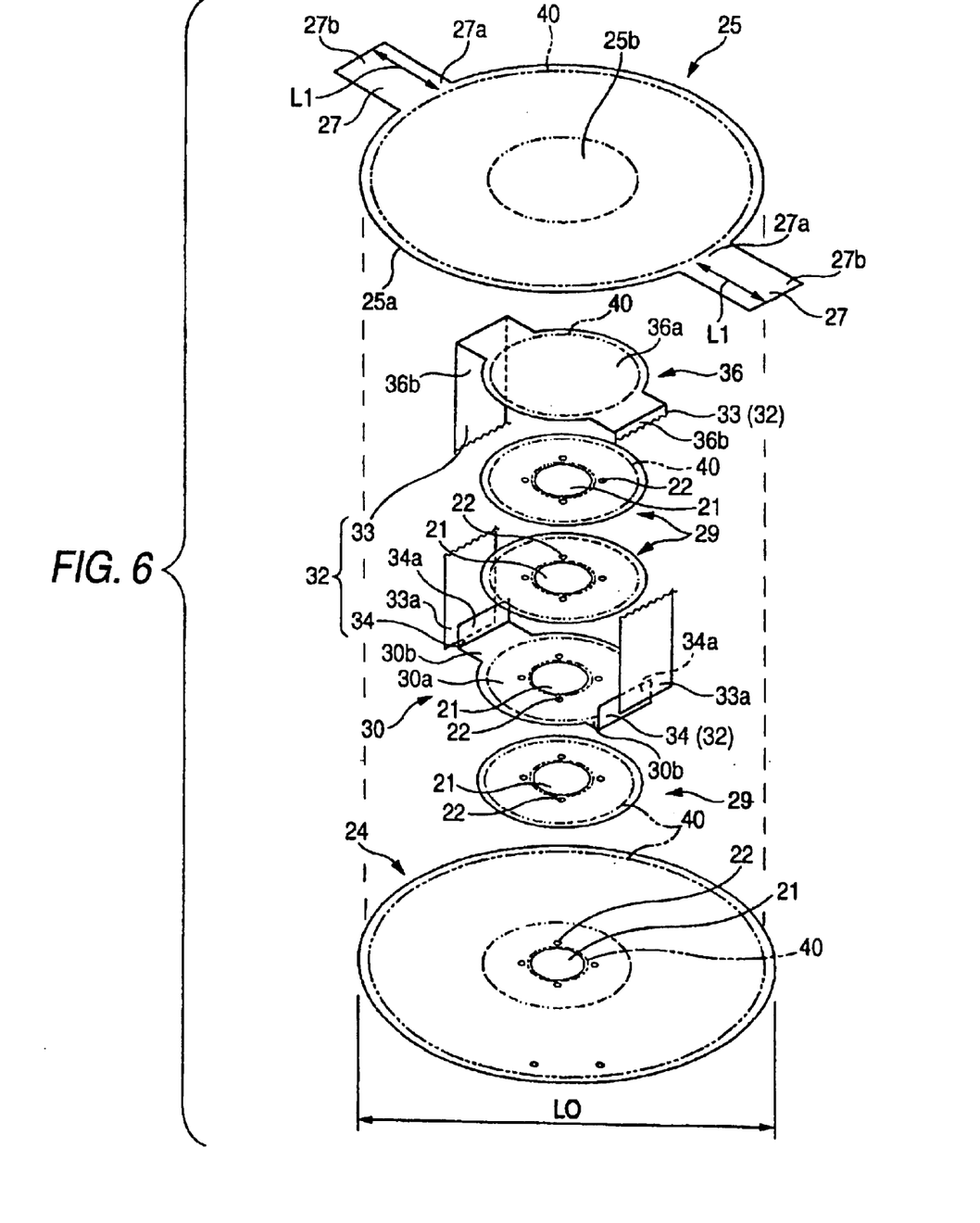
FIG. 6 is a schematically exploded perspective view of the composing members of the air bag.

Now, description will be given below of an embodiment of an air bag according to the invention with reference to the accompanying drawings. As shown in FIGS. 1 and 2, an air bag 20 according to the present embodiment is an air bag which is used in an air bag apparatus M for a steering wheel.

By the way, in the present embodiment, forward and rearward directions, upward and downward directions, and right and left directions are set, unless otherwise specified, based on the state where a steering wheel W disposed on a vehicle is operated for letting the vehicle go straight on.

Specifically, upward and downward directions, which extend along the axial direction of a steering shaft SS (see FIG. 9) to which the steering wheel W is to be assembled, are regarded as the upward and downward directions of the embodiment; the forward and rearward directions of the vehicle which are directions perpendicular to the axial direction of the steering shaft SS are considered as the forward and rearward directions of the embodiment; and, the right and left directions of the vehicle which are directions perpendicular to the steering shaft SS are set as the right and left directions of the embodiment.

Also, the air bag apparatus M, as shown in FIGS. 1 and 2, is disposed on the upper portion of the centrally located boss portion B of the steering wheel W. The steering wheel W includes a ring portion R to be gripped when steering, a boss portion B which is located in the central portion of the steering wheel M and is to be connected to the steering shaft SS (see FIG. 9), and four spoke portions S for connecting together the boss portion B and ring portion R. Also, the steering wheel W includes, as its composing member, the air bag apparatus M and a steering wheel main body 1.

The steering wheel main body 1 includes a core metal 2 made of an aluminum alloy and disposed so as to connect together the ring portion R, boss portion B and spoke portion S, a cover layer 3 made of synthetic resin for covering the portion of the core metal 2 that extends over the ring portion R and the ring-portion-R side spoke portion S, and a lower cover 4 which is made of synthetic resin and is disposed in the lower portion of the boss portion B.

The air bag apparatus M, as shown in FIG. 2, includes a folded air bag 20, an inflator 8 for supplying expanding gas to the air bag 20, and a case 10 for storing and holding the air bag 20 and inflator 8.

The inflator 8 comprises a substantially cylindrical-shaped main body 8a including a gas jet-out ports 8b for jetting out expanding gas upwardly, and a substantially square-plate-shaped flange portion 8c disposed so as to project from the outer peripheral surface of the main body 8a. In the flange portion 8c, there are formed insertion holes 8d through which bolts 6a projecting from retainers 6 (which will be discussed later) can be inserted.

The retainer 6 is made of a substantially square-ring-shaped metal plate and includes, in the four corners thereof, four bolts 6a which project downwardly. The retainer 6 not only retains the peripheral edge of an opening 21 (to be discussed later) formed in the air bag 20 but also makes the bolt 6a project from the flange portion 8c of the inflator 8 through the peripheral edge of the opening 21 and a bag holder 11 (to be discussed later). The nuts 7 are fastened to their associated bolts 6a, whereby the air bag 20 is mounted on the bag holder 11 of the case 10 using the retainer 6.

The case 10 is composed of the bag holder 11 made of a metal plate, and a pad 15 made of synthetic resin serving as an air bag cover.

The bag holder 11 is composed of a substantially rectangular-shaped holder plate 12 with its top portion opened and a backup plate 13 cooperating together with the holder plate 12 in holding the pad 15 between them. The two plates 12 and 13 respectively include insertion holes 12a and 13a into which the main body 8a of the inflator 8 can be inserted from below, and mounting holes 12b and 13b which are formed in the peripheries of the insertion holes 12a and 13a and through which the bolts 6a of the retainer 6 can be inserted. Also, the backup plate 13 includes a bracket (not shown) which can be connected to the core metal 2 of the steering wheel main body 1.

The pad 15 includes a cover body portion 16 for covering the upper portion of the boss portion B and a side surface 17 which projects downwardly from the lower surface of the peripheral edge of the cover body portion 16 in a substantially square-cylinder-shaped manner. The cover body portion 16 includes, in the portion thereof that is enclosed by the side wall portion 17, two door portions (not shown) which, when the air bag 20 is expanded, can be opened in the forward and rearward directions of the steering wheel W; and, in the peripheries of the two door portions, there are formed thin breaking portions (not shown) which can be pressed and broken by the air bag 20 to thereby open the door portions. While the portion of the side wall portion 17, which is located near to the lower end of the side wall portion 17, is held by and between the holder plate 12 and backup plate 13 constituting the bag holder 11, the side wall portion 17 is retained by the bag holder 11.

In the case of the folded air bag 20, in the present embodiment, the lower surface side thereof is restricted by the holder plate 12 of the bag holder 11 and the main body 8a of the inflator 8, while the upper surface thereof is restricted by the cover body portion 16 and side wall portion 17 of the pad 15.

The air bag 20, as shown in FIGS. 3 to 6, is formed by joining together the outer peripheral edges 24a and 25a of a pair of bag cloths 24 and 25 substantially identical in the outer shape with each other; and, one of the pair of bag cloths constitutes an occupant side (driver side) surface 25 that is located on the occupant (driver) side when the air bag 20 is deployed, while the other constitutes a vehicle body side surface 24 located on the vehicle body side (steering wheel side) when the air bag 20 is deployed.

Also, the air bag 20 includes, in the central portion of the vehicle body side surface 24 on the lower side thereof, a circular-shaped opening, that is, a gas inflow opening 21 into which the main body 8a of the inflator 8 can be inserted in order to allow expanding gas to flow into the air bag 20. In the peripheral edge of the gas inflow opening 21, there is formed a mounting hole 22 through which the bolts 6a of the retainer 6 can be inserted. Further, in the air bag 20, specifically, on the front portion side of the vehicle body side surface 24, there are opened up a plurality of vent holes (not shown) which are used to discharge a surplus of the expanding gas after the expansion of the air bag is completed.

And, according to the present embodiment, the vehicle body side surface 24 and occupant side surface 25 are respectively formed by cutting their associated bag cloths, which are formed by weaving polyamide or polyether threads plainly, into a substantially circular shape. More specifically, in the case of the vehicle body side surface 24, the outer peripheral edge 24a thereof is formed in a circular shape; and, in the case of the occupant side surface 25, except for the drawing strips 27, 27 thereof, the outer peripheral edge 25a thereof is formed so as to have the same circular shape as the outer peripheral edge 24a of the vehicle body side surface 24. The drawing strips 27, which are formed in the occupant side surface 25, are formed two in number; and, the two drawing strips 27 are respectively formed integrally with the occupant side surface 25 in such a manner that they extend outwardly from the right and left edges of the outer peripheral edges 25a of the occupant side surface 25. The length L1 (see FIG. 6) of extension of the respective drawing strips 27 from the circular-shaped outer peripheral edges 25a of the occupant side surface 25 is set shorter than the radial dimension of the circular-shaped outer peripheral edges 25a of the occupant side surface 25 in order to be able to pull in the outer peripheral edges 24a, 25a of the surfaces 24, 25 to the vicinity of the gas inflow opening 21 that provides the vicinity of the central portion of the air bag 20.

In the peripheral edge of the gas inflow opening 21 of the air bag 20, there are formed four substantially circular-shaped reinforcing cloths 29, 30 which are used to protect the air bag 20 against high-temperature expanding gas. In the respective reinforcing cloths 29, 30 as well, there are formed gas inflow openings 21 and mounting holes 22.

Further, within the air bag 20, there are disposed two tethers 32, 32 which, when the air bag 20 is deployed, are used to restrict the spacing distance from the vicinity of the gas inflow opening 21 of the vehicle body side surface 24 to the vicinity of the central portion 25b of the occupant side surface 25 opposed to the gas inflow opening 21. Each of the tethers 32 includes an occupant side portion (driver side portion) to be joined to the occupant side surface 25 and a vehicle body side portion (steering wheel side portion) to be joined to the vehicle body side surface 24, while the mutually approaching leading end portions 33a, 34a of the occupant side and vehicle body side portions 33, 34 are sewn together to thereby join the occupant side and vehicle body side portions 33, 34 to each other. In the present embodiment, the two occupant side portions 33 are formed of a single cloth member 36 for a tether, whereas the two vehicle body side portions 34 are formed of a single reinforcing cloth 30.

And, the tether cloth member 36 includes a circular-shaped main body 36a and two tongue strips 36b, 36b which constitute the leading end portion 33a side of the occupant side portion 33 of each of the tethers 32. Also, the reinforcing cloth 30 includes a main body 30a having the same shape as the reinforcing cloth 29 and two tongue strips 30b, 30b which constitute the leading end portion 34a side of the vehicle body side portion 34 of each of the tethers 32.

By the way, the reinforcing cloths 29, 30 and tether cloth member 36, similarly to the vehicle body side and occupant side surfaces 24 and 25, are respectively formed of an air bag cloth which is formed by weaving polyamide or polyether threads plainly.

And, in the air bag 20 according to the present embodiment, the leading end portions 27b of the respective drawing strips 27, 27 are sewn at the same time when the leading end portions 33a, 34a of the occupant side and vehicle body side portions 33, 34 in each of the tethers 32 located near to them are joined together, and are then mounted onto the near-to-center side of the air bag 20.

Also, the capacity of the air bag 20 according to the present embodiment, when the air bag 20 is expanded, is set equal to the capacity of a conventional-type air bag in which the tethers 32, 32 are disposed, in a state where the air bag 20 is not pulled in by the drawing strips 27, 27. For this reason, the occupant side and vehicle body side surfaces 25, 24 of the air bag 20 are set larger than the outside diameter dimensions of the outer peripheral edges of the occupant side and vehicle body side portions of the conventional-type air bag.

Next, description will be given below of manufacture of the air bag 20. Firstly, the outer peripheral edge of the main body 36a of the tether cloth member 36 is sewn and joined to the occupant side surface 25 using a sewing thread 40. Next, the reinforcing cloths 29, 30 are sewn and joined to the vehicle body side surface 24 using the sewing thread 40. By the way, the gas inflow openings 21 and mounting holes 22 can be previously formed. However, preferably, after completion of the above sewing operations, the gas inflow openings 21 and mounting holes 22 may be formed by punching in the vehicle body side surface 24 and reinforcing cloths 29, 30 integrally therewith. Here, a bent hole (not shown), which is to be formed in the vehicle body side surface 24, may be formed previously or may be formed simultaneously when the vehicle body side surface 24 is formed by punching.

After then, the vehicle side and occupant side surfaces 24, 25 are respectively superimposed on top of each other and developed flat in such a manner that their respective outer surface sides are opposed to each other, and their outer peripheral edges 24a, 25a are sewn and joined together using the sewing thread 40. After completion of the sewing and joining, in order to prevent the sewing margins from appearing on the outer surface of the air bag 20, the air bag 20 is reversed using the gas inflow openings 21. And, after such reversal, the leading end portions 27b of the respective drawing strips 27 are pulled out from the gas inflow openings 21, and the mutually corresponding tongue strips 30b, 36b and leading end portions 27b are superimposed on top of each other and are sewn and joined together using the sewing thread 40 to thereby form the tethers 32; and, at the same time, mounting of the leading end portions 27b of the drawing strips 27 onto the center side of the air bag 20 is completed.

And, when assembling the air bag apparatus M using the above-manufactured air bag 20, firstly, the retainer 6 is disposed within the air bag 20 in such a manner that the bolts 6a project from the mounting holes 22 and, in a state where the retainer 6 is disposed within the air bag 20, the air bag 20 is folded. To fold the air bag 20, for example, in a state where the occupant side surface 25 is superimposed on top of the vehicle body side surface 24 and is developed flat, a plurality of folds are formed in the neighboring portions of the gas inflow openings 21 along the forward and rearward directions of the steering shaft, and the right and left outer peripheral edges of the air bag 20 are made to approach the vicinity of the central portion of the air bag 20. Next, in the case where a plurality of folds are formed so as to extend along the right and left directions and the front and rear peripheral edges of the air bag 20 are made to approach the vicinity of the central portion of the air bag 20, the folding operation of the air bag 20 can be completed.

Next, description will be given below of an operation to store the thus folded air bag 20 into the case 10. Firstly, the bolts 6a of the retainer 6 projecting from the folded air bag 20 are inserted through the mounting holes 21 formed in the holder plate 12 of the bag holder 11, and the air bag 20 is placed on the holder plate 12.

After then, the pad 15 is placed on the air bag 20 from above and is secured to the holder plate 12, the backup plate 13 is disposed below the holder plate 12, and the side wall portion 17 of the pad 15 is held by the holder plate 12 and backup plate 13, so that the pad 15 is held by the bag holder 11. At the then time, the bolts 6a of the retainer 6 are inserted through the mounting holes 13b formed in the backup plate 13.

After that, in the case where the main body 8a of the inflator 8 is inserted into the insertion holes 12a, 13a and openings 21 of the bag holder 11 from below, the bolts 6a of the retainer 6 are projected downwardly from the insertion holes 8d formed in the flange portion 8c of the inflator 8 and the nuts 7 are threaded to the bolts 6a. Thus, the air bag 20, bag holder 11 and inflator 8 can be assembled together as an integral body to complete the assembly of the air bag apparatus M.

And, in a state where the core metal 2 of the boss portion B of the steering wheel main body 1 is fastened to the steering shaft SS of the vehicle, by using a bracket (not shown) disposed in the bag holder 11, the air bag apparatus M can be mounted onto the steering wheel W.

In the case where the steering wheel W is mounted on the vehicle and the expanding gas is jetted out from the gas jet-out opening 8b of the inflator 8, the given portion of the pad 15 can be broken and thus the folded air bag 20 can be expanded greatly.

Figure 7:
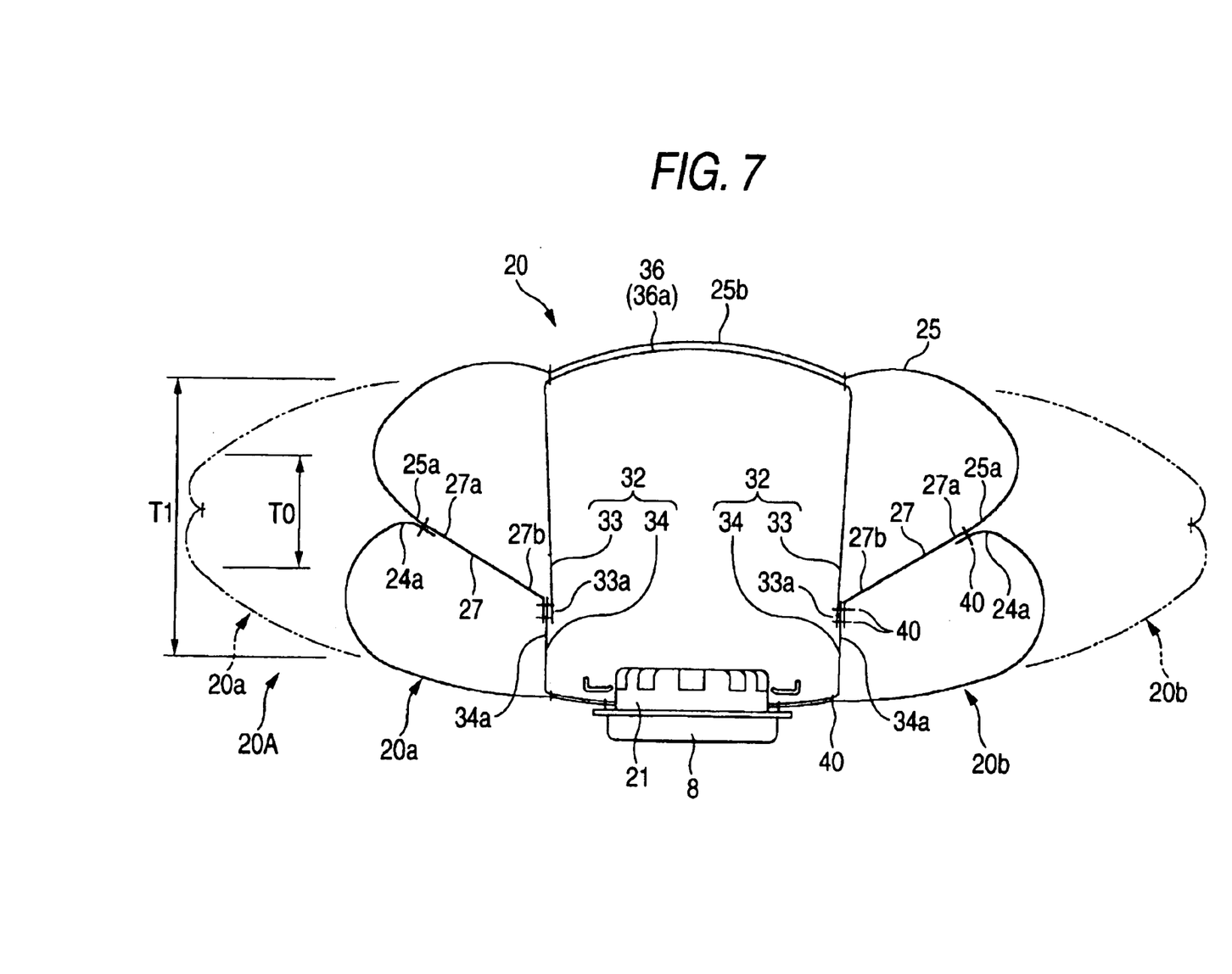
FIG. 7 is a schematic section view of the air bag in its deployment state, taken along the right and left directions of a vehicle.

And, in the air bag 20, as shown in FIG. 7, in its deployment, the outer peripheral edges of the occupant side and vehicle body side surfaces 25, 24, which join together the occupant side and vehicle body side surfaces 25, 24, are pulled in to the vicinity of the central portion of the air bag 20. Thus, in the pulled-in left and right outer peripheral edge portions 20a, 20b of the air bag 20, the outer peripheral edges 25a, 24a of the occupant side and vehicle body side surfaces 25, 24 bite into the air bag 20, which can increase the substantial thickness T1 of the air bag 20. By the way, in a state where the drawing strips 27 are not employed and the outer peripheral edges 24a, 25a of the surfaces 24, 25 are not pulled in, as represented by a conventional air bag 20A shown by chain double-dashed lines in FIG. 7, the left and right outer peripheral edge portions 20a, 20b of the conventional air bag 20A provide a thickness T0 which is equal to or less than the thickness T1 of the air bag 20 of the present invention.

Thus, since means for increasing the thickness T1 of the outer peripheral edge portions 20a, 20b of the air bag 20 can be constructed simply by using the drawing strips 27, 27 which pull in the outer peripheral edges 25a, 24a of the occupant side and vehicle body side surfaces 25, 24 to the vicinity of the central portion of the air bag 20, the mutual connection of the surfaces 24, 25 using a sewing operation as well as the connection of the drawing strips 27 to the given portion can be carried out easily, thereby being able to eliminate the fear that the easy manufacture of an air bag of a plane air bag type can be impeded.

Therefore, according to the air bag 20 of the present embodiment, even in the case where it is formed as an air bag of a plane air bag type, it can be manufactured simply without requiring time and labor and, similarly to a three-dimensional-shaped air bag, the given portions 20a, 20b of the outer peripheral edge thereof can be expanded thick.

Also, according to the air bag 20 of the present embodiment, the capacity of the portions 20a, 20b thereof pulled in by the drawing strips 27, 27 are decreased when compared with a state in which they are not pulled in. Therefore, in the case where a conventional air bag 20A of a non-pull-in type and air bag 20 according to the present embodiment are identical in capacity with each other, the capacity of the other portions of the present air bag 20 than the pulling-in portions thereof, specifically, in the present embodiment, the capacity of the front and rear outer peripheral edge portions 20c, 20d thereof can be increased (see FIG. 9). That is, the outer peripheral edges 25a, 24a of the occupant side and vehicle body side surfaces 25, 24, which are located in the other portions 20c, 20d than the pulling-in portions 20a, 20b, can be extended to thereby be able to increase the capacity of the portions 20c, 20d.

And, as in the present embodiment, in the case where the extension portion of the outer peripheral edges 24a, 25a is structured such that it includes the portion 20d to be interposed between the ring portion R of the steering wheel W and the abdomen DB of the driver D, the abdomen of the driver D can be protected effectively. Of course, in this case as well, according to the air bag 20, in the case where the air bag 20 is the same in capacity as the conventional non-pull-in-type air bag 20A, the inflator 8 having the same output can be used without delaying the time necessary for completion of the deployment thereof.

And, according to the present embodiment, since the base portions 27a sides of the drawing strips 27 are formed integrally with the occupant side surface 25 so that they can be extended outwardly from the outer peripheral edge 25a of the occupant side surface 25, it is not necessary to dispose the drawing strips 27 separately, which does not increase the number of the composing parts of the air bag 20. And, because the arrangement of the drawing strips 27 can be completed simply by joining only the leading end portion 27a sides of the drawing strips 27 to the vicinity of the central portion of the air bag 20, an increase in the number of manufacturing steps and costs can be restricted as much as possible.

By the way, in the present embodiment, there is illustrated a case in which the drawing strips 27 are formed integrally with the occupant side surface 25. However, the drawing strips 27 may also be formed integrally with the vehicle body side surface 24. Also, when a plurality of drawing strips 27 are used, they may also be divided properly into pieces the base portion 27a sides of which are joined integrally with the occupant side surface and pieces the base portion 27a sides of which are joined integrally with the vehicle body side surface 24.

Of course, unless the above-mentioned operations and effects are taken into consideration, the drawing strips 27 may also be formed as separate members, and the base portion 27a sides of the drawing strips 27 may be connected to the outer peripheral edges 25a, 24a of the occupant side and vehicle body side surfaces 25, 24 by sewing or by an adhesive agent.

Also, according to the present embodiment, since the tethers 32, 32 for restricting the mutual spacing distance between the occupant side and vehicle body side surfaces 25, 24 at the deployment of the air bag 20 are disposed in the interior of the air bag 20, even in the case where the outer peripheral edge portions 20a, 20b of the air bag 20 increase in thickness, a plane state can be secured in the vicinity of the central portion 25b of the occupant side surface 25; and, therefore, when the occupant side surface 25 interferes with the occupant (driver) D, no partial pressure can be applied to the driver D, thereby being able to enhance the driver D protecting performance of the air bag 20.

Further, according to the present embodiment, each of the tether 32, 32 includes the occupant side portion 33 to be sewn and joined to the occupant side surface 25 and the vehicle body side portion 34 to be sewn and joined to the vehicle body side surface 24; and, the tether 32 can be formed by sewing and joining together the end portions 33a, 34a of the occupant side portion 33 and vehicle body side portion 34. And, in each of the drawing strips 27, one end portion 27a is joined integrally with the outer peripheral edge 25a of the vehicle body side surface 25, while the other end portion 27b is sewn and joined to the tether 32 at the same time when the end portions 33a, 34a of the occupant side portion 33 and vehicle body side portion 34 of each tether 32 are sewn and joined together, whereby the drawing strip 27 is joined to the tether 32.

According to the above structure, there can be eliminated a separate operation to join the leading end portions 27b of the drawing strips which extend toward the center of the air bag 20. And, even in the case where the drawing strips 27, 27 are disposed in the interior of the air bag 20, an increase in the number of manufacturing steps and costs of the air bag 20 can be restricted as much as possible. Especially, in the case of the present embodiment, since the drawing strips 27, 27 are formed integrally with the outer peripheral edge 25a of the occupant side surface 25, there can be also eliminated the operation to join the base portions 27a of the drawing strips 27 to the outer peripheral edge 25a, which makes it possible to restrict an increase in the number of manufacturing steps and costs further than in the previous case.

By the way, unless the above operations and effects are taken into account, the leading end portions 27b of the drawing strips 27 may also be joined to the vicinity of the central portion of the air bag 20 such as the peripheral edges of the gas inflow openings 21 of the air bag 20, or the vicinity of the center 25 of the occupant side surface 25, or the tethers 32 by sewing or by an adhesive agent.

Also, unless the above operations and effects are taken into account, the tethers 32 may be disposed on the front and rear sides of the peripheral edge of the gas inflow opening 21, or in the four front, rear, right and left positions of the peripheral edge of the gas inflow opening 21, or in the three or five positions which extend radially with respect to the gas inflow opening 21.

Further, in the case of the air bag 20 according to the present embodiment, since the occupant side and vehicle body side surfaces 25, 24 are formed substantially in a circular shape, there can be obtained the following operations and effects.

That is, when compared with the air bag (the conventional-type air bag 20A) of a non-pull-in type in which the occupant side and vehicle body side surfaces 25, 24 are formed substantially in a circular shape and the outer peripheral edges 25a, 24a thereof are not pulled in, in the present embodiment, using the occupant side and vehicle body side surfaces 25, 24 having a large outside diameter dimension L0 (see FIG. 6), there can be manufactured an air bag 20 having the same capacity as the conventional-type air bag 20A. And, in the case where the occupant side and vehicle body side surfaces 25, 24 are formed substantially in a circular shape, similarly to the conventional-type air bag 20A, using the operation to join together the outer peripheral edges 25a, 24a of the occupant side and vehicle body side surfaces 25, 24, the air bag 20 according to the present embodiment can be manufactured easily. In other words, without changing the manufacturing steps of the conventional-type air bag 20A as much as possible, there can be easily manufactured the air bag 20 according to the present embodiment in which the capacity of the given portions 20c, 20d is increased.

In the present embodiment, especially, in order that the air bag 20 can be used in the air bag apparatus M for a steering wheel, the drawing strips 27, 27 are disposed in two portions of the right and left edge sides of the outer peripheral edges 25a, 24a of the occupant side and vehicle body side surfaces 25, 24 in such a manner that, when the air bag 20 is carried onboard the vehicle and the air bag 20 is deployed, the drawing strips 27, 27 are able to pull in the right and left edge sides of the outer peripheral edges 25a, 24a of the occupant side and vehicle body side surfaces 25, 24 to the vicinity of the central portion of the air bag 20.

Figure 8:
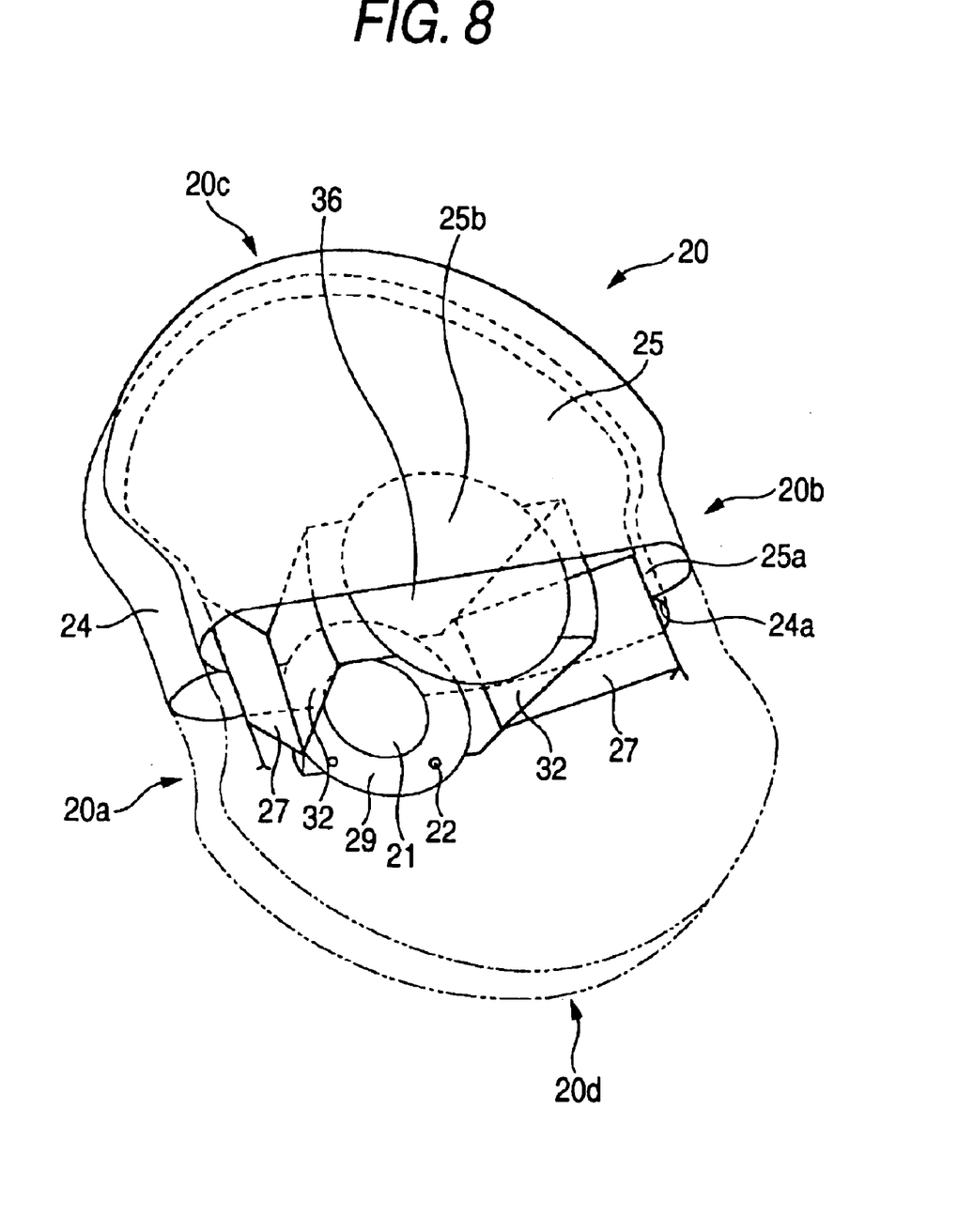
FIG. 8 is a schematic perspective view, broken away in part, of the air bag, showing its deployment state; and, FIG. 9 is a schematic view of the air bag in deployment, when it is viewed from laterally.
Figure 9:
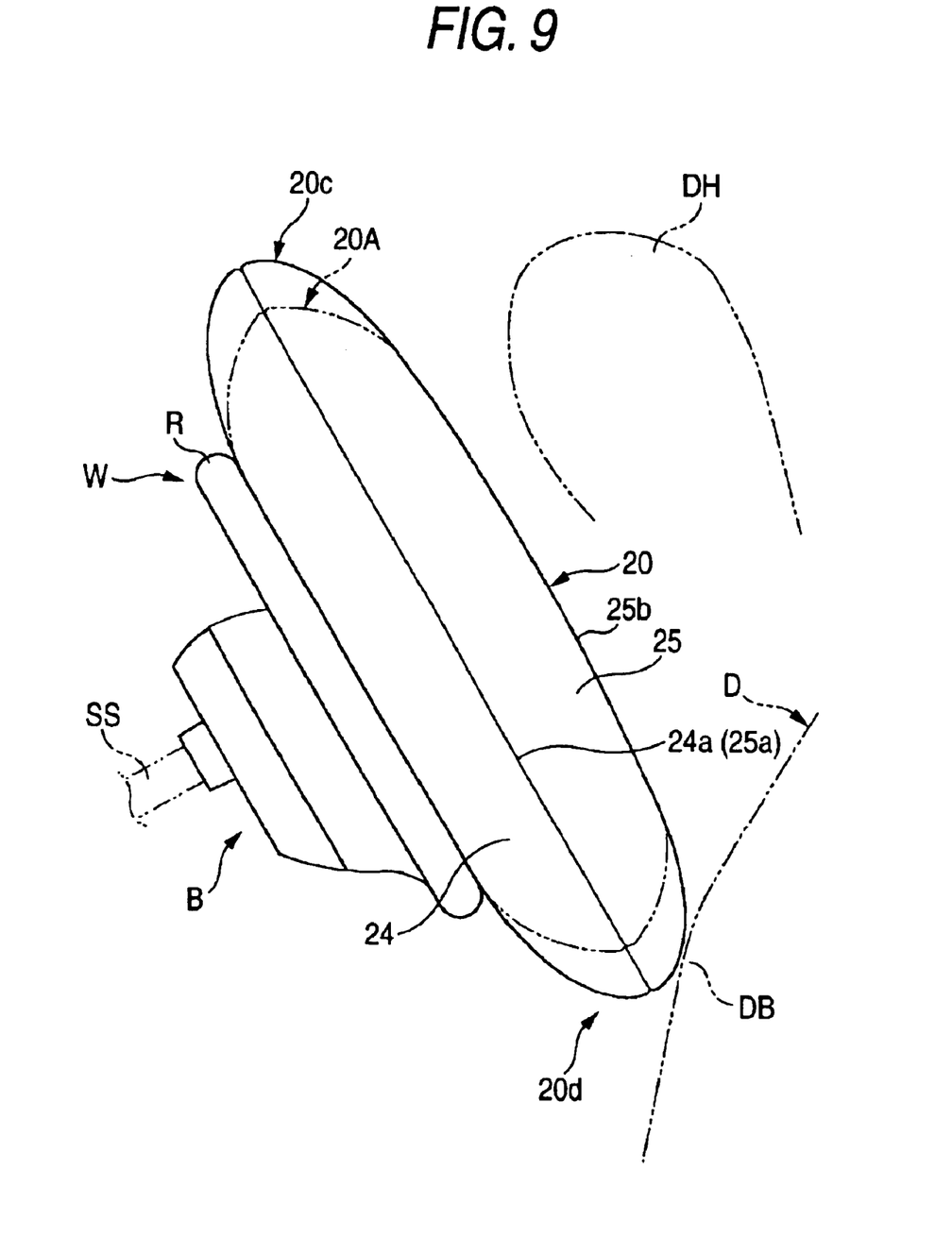

According to this structure, the air bag 20 in the deployment provides such a cocoon shape (a gourd shape) as shown in FIG. 8 in which the left and right portions 20a, 20b of the outer peripheral edge of the air bag 20 are dented to thereby extend the front and rear portions 20c, 20d. That is, the air bag 20 has a shape in which, as shown in FIG. 9, the front and rear portions 20c, 20d of the air bag 20 serving as an area for protecting the head portion DH and abdomen DB (or chest) of the driver D when the driver D approaches the steering wheel W side increase in capacity and are thereby extended on the front and rear sides, which makes it possible to protect the driver D effectively. Further, although the left and right edges 20a, 20b of the air bag 20 in the deployment increase in thickness, they are dented toward the central side of the air bag 20 by an amount corresponding to the pulled-in right and left portions thereof when compared with the conventional-type air bag 20A. Therefore, the left and right portions 20a, 20b are made difficult to interfere with the arm of the driver D gripping the ring portion R of the steering wheel W, thereby being able to prevent unnecessary pressure caused by the expansion of the air bag 20 from being applied to the vicinity of the driver's arm.

By the way, in the present embodiment, description has been given of the air bag 20 which is used in the air bag apparatus M for a steering wheel. However, the invention is not limited to the air bag for use in the air bag apparatus M for a steering wheel but it can also be applied to other air bag, provided that the air bag is an air bag of a plane air bag type. For example, the invention can also be applied to an air bag for use in a passenger seat air bag apparatus to be disposed on an instrumental panel disposed in front of a passenger seat, or to an air bag for use in a side-collision air bag apparatus to be carried on board the seat of the vehicle.

What is claimed is:

1. An air bag comprising:
    a pair of bag cloths, wherein the pair includes a first bag cloth forming an occupant side surface during deployment of the air bag and second bag cloth forming a vehicle body side surface during deployment of the air bag, and wherein respective outer peripheral edges of said first and second bag cloths are joined to form an outer peripheral edge of said air bag; and
    a pair of drawing strips provided in said air bag, wherein each drawing strip connects the outer peripheral edge of said air bag to a vicinity of a center of said air bag inside said air bag, wherein:
        said occupant side surface and said vehicle body side surface are respectively formed in a substantially circular shape;
        the outer shapes of the bag cloths are substantially identical to each other;
        the drawing strips are provided at two locations on the outer peripheral edge of said air bag, and the two locations are opposite to each other with respect to the center of said air bag, and the two locations are only on right and left sides of the air bag; and
        said drawing strips pull the outer peripheral edge of said air bag at the two locations to the vicinity of the center of said air bag during deployment of said air bag; and
    a tether provided in said air bag for restricting a spacing distance between said occupant side surface and said vehicle body side surface at the deployment of the air bag, wherein said tether includes an occupant side portion joined to said occupant side surface and a vehicle body side portion joined to said vehicle body side surface, and respective end portions of said occupant side portion and said vehicle body side portion are joined to each other, and wherein one end portion of one of said drawing strips is joined to said tether.

2. An air bag according to claim 1, wherein each drawing strip is formed integrally with one of said first and second bag cloths so as to extend from said outer peripheral edge of said one of said first and second bag cloths.

3. A manufacturing method of an air bag comprising the steps of: providing a pair of bag cloths, wherein a drawing strip is formed integrally with one of said bag cloths so as to extend from an outer peripheral edge thereof; connecting an end of said drawing strip to a vicinity of a center of said air bag; and joining respective outer peripheral edges of said pair of bag cloths, wherein cloth for forming a tether is provided between said pair of bag cloths, and an end of said drawing strip is sewn to said cloth forming said tether when said cloths are joined to form said tether.

* * * * *